United States Patent [19]

Malachowski et al.

[11] Patent Number: 5,337,135
[45] Date of Patent: Aug. 9, 1994

[54] HIGHER PRODUCTIVITY TRAYLESS DUPLEX PRINTER WITH VARIABLE PATH VELOCITY

[75] Inventors: Michael A. Malachowski; David R. Kamprath, both of Webster, N.Y.

[73] Assignee: Xerox Corporation, Stamford, Conn.

[21] Appl. No.: 129,973

[22] Filed: Sep. 30, 1993

[51] Int. Cl.⁵ ............................................. G03G 15/00
[52] U.S. Cl. .................................... 355/319; 271/65; 271/270; 355/208; 355/309; 355/321; 355/24
[58] Field of Search ................ 355/308, 309, 319, 321, 355/325, 23, 24, 208, 313, 77; 271/285, 286, 291, 270, 65, 186, 301, 3

[56] References Cited

U.S. PATENT DOCUMENTS

| | | | |
|---|---|---|---|
| 4,459,013 | 7/1984 | Hamlin et al. | 355/23 |
| 4,568,169 | 2/1986 | Wada et al. | 271/186 X |
| 4,588,284 | 5/1986 | Frederico et al. | 355/308 X |
| 4,660,963 | 4/1987 | Stemmle | 355/24 |
| 4,780,745 | 10/1988 | Kodama | 355/24 X |
| 4,853,740 | 8/1989 | Ushio et al. | 355/319 |
| 4,918,400 | 4/1990 | Stemmle | 355/24 X |
| 4,918,490 | 4/1990 | Stemmle | 355/318 |
| 4,935,786 | 6/1990 | Veeder | 355/319 |
| 5,060,025 | 10/1991 | Kümmel et al. | 355/319 |
| 5,095,342 | 3/1992 | Farrell et al. | 355/319 |
| 5,159,395 | 10/1992 | Farrell et al. | 355/319 |
| 5,184,185 | 2/1993 | Rasmussen et al. | 355/308 |

FOREIGN PATENT DOCUMENTS 0002769  1/1991  Japan .................................. 355/319

OTHER PUBLICATIONS

*Xerox Disclosure Journal*–vol. 18, No. 4 Jul./Aug. 1993

"Throughput Increase of Simplex–Duplex Intermix Jobs" By: David W. Covert.

*Primary Examiner*—Matthew S. Smith

[57] ABSTRACT

In a printing system capable of printing and outputting collated sets of plural duplex copy sheets from input job sets of plural page images using a trayless duplexing buffer loop path of a known normal plural copy sheet length for recirculating the copy sheets imaged on one side back to be imaged on their opposite sides; operating in a continuous loop burst-interleave mode, using a variable speed duplex drive, for driving at least a major portion of the duplexing path sheet feeders at at least two different sheet feeding speeds so as to initially feed a limited number of the sheets to be printed on one side, less than the duplexing path length, at full rate without skips, to the duplexing path to be selectively partially fed therein at substantially higher than normal velocities, and to variably selectively reduce the velocity of the duplexing path with the initial sheets therein, to generate sheet interleaving spaces between these duplexing path sheets, so that they may be interleaved for their second side printing with subsequent first side prints until the final sheets of the job, which are also fed through the duplexing path at higher than normal speeds for different distances so as to close up interleaving spaces. This increases the duplex copying rate of the printing system by reducing or eliminating skipped pitches without requiring an increase in the given or normal printing rate.

16 Claims, 3 Drawing Sheets

HIGHER PRODUCTIVITY TRAYLESS DUPLEX PRINTER WITH VARIABLE PATH VELOCITY

This disclosed system relates generally to the printing of duplex (printed on both sides) copy sheets with a buffer loop (endless loop) duplexing path. It is especially suitable for high productivity on-demand page printers. The disclosed system provides more efficient duplexing of multipage collated jobs with reduced skipped printer pitches, for more closely spaced or continuous production of duplex copy sheets, for higher overall printing productivity, without requiring increased electronic page buffer memory storage requirements, and with relatively simple and inexpensive machine paper path modifications, and while remaining fully compatible with normal printing of simplex (one side printed) sheets in the same printing apparatus.

The term "printers" is used broadly herein, as it will be appreciated that the disclosed system may apply to xerographic or other electrostatographic, ink jet, ionographic or almost any printing system in which the images are reorderable electronically, including electronic or digital "copiers". It may even be usable in optical copiers especially with a recirculating document feeder capable of reordering and automatically feeding reordered originals, as disclosed in Xerox Corporation U.S. Pat. No. 4,941,023. The terminology "output", "sheets", "prints", or "copies" is used alternatively or interchangeably herein for the hardcopy sheets being printed by the printer.

Electronic input of electronic page images in electronic page ordering is discussed in the examples herein, rather than a sequence of physical document pages for optical input, as in a conventional copier. Thus, a (document) "page" herein refers to the inputted information to be printed on one side of a copy sheet, and its page number refers to the job set position or copying order of that page, irrespective of any actual or physical page numbers, if any. Each duplex copy sheet is thus conventionally regarded herein as having two consecutive page numbers corresponding to the two respective page images printed on its opposite sides.

Some prior art noted in this technology area of improved duplex systems in general, or endless buffer loop printing systems in particular, includes the following Xerox Corporation U.S. Pat. Nos. 4,459,013 by Hamlin, et al., issued Jul. 10, 1984, entitled "Duplex/Simplex Precollation Copying System"; 4,660,963 by Denis Stemmle, issued Apr. 28, 1987; 4,918,490 by Denis Stemmle, issued Apr. 17, 1990, entitled "Batch Mode Duplex Printing"; 5,159,395 to Michael Farrell, et al., issued Oct. 27, 1992, entitled "Method of Scheduling Copy Sheets in a Dual Mode Duplex Printing System"; 5,095,342, to Michael Farrell, et al. entitled "Methods for Sheet Scheduling in an imaging System Having an Endless Duplex Paper Path Loop"; and 5,184,185, issued Feb. 2, 1993, to Michael Farrell, et al., entitled "Duplex Printing Scheduling System Combining Finisher Interset Skipped Pitches with Duplex Sheet Scheduling"; and other art cited therein. [Said other cited art includes U.S. Pat. No. 4,453,841 to Mead Corp. and Canon Corp. EP 0295 612.] Also "Xerox Disclosure Journal" publication Vol. 18 No. 4, July/August 1993, pp. 431–433. The latter-cited Xerox Corp. patents, such as U.S. Pat. No. 5,095,342 are of particular interest as showing examples of duplex buffer loops, specifically, the Xerox Corporation "DocuTech" printer, also shown herein in FIG. 3 by way of one example of a potential application of the subject system. Also, in said above U.S. Pat. No. 4,918,490, etc., are brief descriptions of the duplexing in the prior art Xerox Corporation "9700" and "5700" duplex printers.

Also particularly noted re a duplexing printer is Siemens U.S. Pat. No. 5,060,025 issued Oct. 22, 1991 to Klaus Kümmel, et al. That system self-evidently has much more complex paper paths. Col. 11 lines 50–54 indicates the illustrated embodiment requires 2 frontside stores for simplex, plus 3 reverse side stores for duplex. Col. 3, for example, describes paper transport elements of variable transport speed and a higher speed retard channel, and Col. 15 notes acceleration to a higher speed of paper rollers R6 for duplexing. The front side (F) and rear side (R) printing sequence for 8 serial duplex A4 sheets described in Col. 14, lines 32–40, is: 1F, 2F, 3F, 4F, 1R, 5F, 2R, 6F, 3R, 7F, 4R, 8F, 5R, 6R, 7R, 8R. In describing the duplexing operation in Co. 15, lines 7–10 in particular, paper is accelerated to higher than process speed by rollers P6 while rollers P5 remain at process speed, and the W1 turning station (inverter) operates at reduced process speed. That is, only the specified feed rollers are sped up, not the entire duplex loop path.

Xerox Corporation U.S. Pat. No. 4,231,567 to R. T. Ziehm discloses duplex path buffering with sheet shingling, as does the Canon NP-4835 copier duplex tray. Shingling (partially overlapping) sheets in a trayless buffer loop is one alternative to duplex buffer tray, if one wants to increase (rather than desirably decrease) the number of sheets in the duplex path, but it requires special paper handling and at least two different transport velocities in the duplex path at the same time to insure proper overlapping and then subsequent separation and jam clearance may be more complicated.

Fuji Xerox U.S. Pat. No. 5,197,726 issued Mar. 30, 1993, is one example of a sheet feeding velocity control system in general. Various others are known in the sheet feeding art.

There is disclosed herein a simple, low cost duplexing system for efficiently utilizing a printer with a simple integrated copy sheet and duplexing return sheet feeding path, desirably comprising an otherwise conventional trayless, endless loop, duplexing path, but with different sheet feeding velocities and timings to print duplex documents in a different, more efficient order or spacing.

Further by way of background, in copier/printers where input page imaging and printing on both sides of the copy sheets (duplex printing) is provided, it is important to try to fill every available imaging panel or pitch space on the photoreceptor in order to maintain a constant copy output and the highest possible machine productivity. Most printers (vs. copiers) use a trayless (or quasi-trayless) duplex return path, and use 1 to N page order printing to reduce the amount of data storage required for duplex copy sheets, and for other reasons further explained below. There are at least four types of printer duplexing modes, which are briefly generally described below:

1. Interleave Mode: Sheets of paper are fed into the system at half-rate (every other pitch), and images are transferred to one side. These sheets circulate through the duplex path and fill the empty pitches left by the sheet feeder operating at half-rate. Images are transferred to the other side of the sheets, and they exit the system. Blank photoreceptor panels (skipped pitches)

are inserted at the beginning of the job while filling the duplex path, and at the end while the duplex path empties. The path length (N) must be an odd integer for the second side images to be on blank photoreceptor panels between first side images. This mode would probably only be used with a trayless duplex path, but could also work with a duplex tray system.

2. "Burst" Mode: The first N sheets of paper are fed into the system at full rate (N is the duplex path length). No paper is fed for the next N sheets. This pattern repeats. Images are transferred to one side of the groups of sheets. They circulate through the duplex path and then fill the N consecutive empty pitches skipped by the sheet feeder. Images are transferred to the other side of these sheets, and they exit the system. Any blank panels are inserted after the last first side images are printed. I.e., not inserted until the last group of second side images are printed. However, no blank photoreceptor panels are required if the number of sheets in the job is a multiple of N. This mode would probably be used only with a trayless duplex path, but would also work with a duplex tray.

3. Immediate Duplex: Immediate duplex can be considered to be a special case of the three modes listed above where N=1. The second side image is printed with the panel immediately following the first side image. No blank panels would be required. This mode does not have a conventional duplex path and would require a special subsystem to somehow very rapidly invert the sheet between image transfers and/or require two separate transfer stations, or require image transfer to both sides of the sheet simultaneously, any of which is known to be difficult and to require unique hardware and control systems.

4. Burst/Interleave Mode: The first N sheets of paper are fed into the system at full rate. The remaining sheets are fed at half rate. Images are transferred to one side. The sheets enter the duplex path and are stored temporarily as required and reintroduced into the duplex path at half rate to fill the empty pitches left by the feeder. Images are transferred to the other side of the sheets and they exit the system. The last N sheets are reintroduced into the duplex path at full rate. Blank panels are not required if the number of sheets is greater than N. For smaller jobs, this mode works the same as the burst mode. However, a duplex tray (or an alternative multiple sheet duplex buffer, such as something like a sheet shingler), could serve to enable a burst/interleave duplex mode.

In view of the above, it was determined through studies by the inventors here that the most productive mode, with the exception of said theoretical immediate duplex mode, is the above burst/interleave mode, which, however, as noted, presently requires a duplex tray for sheet buffering.

The system disclosed herein can achieve full duplex productivity in what may be considered a type of burst/interleave mode, but without a duplex tray, in a continuous loop duplex path system.

Further by way of general background, it is generally known that electronically inputted printers can desirably provide more flexibility in page sequencing (page copying presentation order) than copiers with physical document sheet input. The printer input is electronically manipulatable electronic page information, rather than physical sheets of paper which are much more difficult to reorder or manipulate into a desired sequence. As also shown in the art cited herein, it is known that certain such reordered or hybrid document page copying orders or sequences may be copied onto a corresponding sequential train of copy sheets in an appropriate copier or printer to provide higher copying machine productivity, yet correct page order copy output, especially for duplex copies made with a copier with trayless duplexing, i.e., providing a limited length endless buffer loop duplexing path for the copy sheets being duplexed. The system disclosed herein provides for improvements therein.

Further by way of background, it is preferred that the output tray or finisher output stacker of the printer system stacks the copy sheets face down. That way a simplex job can also stack face down, so that the simplex pages will be properly collated after being printed in a desired 1 to N (forward or ascending) serial order. Thus, for such a preferred facedown output stacking paper path configuration, in a printing system transferring images to the top of the sheet, with a non-inverting output, preferably the first sides printed within each job batch for a duplex job will be the odd sides, and the second sides printed will be the even sides. This also provides proper collation of duplex jobs in the output tray without requiring a (known) output path inverter, [although an inverting path can be used if desired]. If the paper path configuration is such that simplex prints are desirably outputted faceup instead, as in a N to 1 page order printer, or with transfer to the bottom of the sheet, or inversion in the output path, then the first sides printed within each batch for a duplex job will desirably be the even sides, and the second sides printed will be the odd sides.

Many duplex printers also have a long delay or wait before the first duplex copy emerges from the printer (a long "first copy out time"), because many first side copies are being made and internally retained initially. That is undesirable for customer perception. Many printers are also very inefficient for small duplex jobs of only a few pages, which is particularly disadvantageous if a large number of copy sets are being made from such a job.

As noted, it is desirable to provide duplexing systems using trayless duplex buffer loop technology, even for smaller and less expensive printers. Eliminating a conventional intermediate sheet stacking duplexing buffer tray, and its re-separating feeder, eliminates sheet jams and jam clearances associated therewith. It eliminates the sheet feeder/separator hardware and the space it requires as well as associated hardware such as sheet stackers, edge joggers, set separators, bail bars, and tray edge guide resetting means for different sheet sizes. Duplex systems that require a duplex buffer tray require such hardware for reliable intermediate copy sheet stacking in that tray after side one printing, sheet re-separation, and sheet re-feeding. Such duplex tray systems have much less positive and more error-prone sheet feeding, more complex jam clearance job recovery and reduce efficiency for short (small) collated print jobs. (Jobs with a small number of document pages and corresponding copy pages per set.) Yet, short jobs predominate in many user's needs.

Irrespective of the job size, in other trayless or tray type duplexing systems, printers with long (multisheet length) duplex paths typically require a number of skipped pitches (non-print machine cycles). That is, in general, many current duplex printer/copier systems suffer substantial productivity losses due in part to skipped pitches between the imaging of the respective sides or pages of the duplex documents and/or between the copying of the first and second sides of their copy sheets. That includes time wasted waiting for the feeding and turning over (inversion) of copy sheets being duplexed and for feeding these copy sheets along duplex feeding paths to and from the image transfer station for receiving their first and second side images, and/or delays for maintaining proper interleaved sheet collation of the copy sheets.

With this disclosed system, the printer does not normally have to wait (skip one or more copying pitches) for the time required to turn over and return to the transfer station a copy sheet for copying its other side in the desired sequence, yet collation of the copy sheets is provided at their output. There is high efficiency precollation copying providing collated copy set output with minimal skipped pitches (skipping of copying cycles). Copier productivity loss may be reduced or eliminated. Productivity can therefore more closely approach 100%.

The document page presentation order is fully coordinated with the path length and velocity of the copy sheet duplex buffer loop within the printer for improved efficiency duplex copying. That is, coordinated with the sheet velocity and separation within a trayless, endless loop, recirculating copy sheet path, of a type known per se, which is looping the copy sheets to be duplexed from and back to the same imaging station (with inversion). This eliminates any need for intermediate copy sheet stacking or refeeding in a duplex tray or the like between first and second side printing of the duplex sheets.

Another specific feature of the embodiments disclosed herein is to provide the apparatus of claim 1 herein.

Further specific features disclosed herein, individually or in combination, include those wherein the features of claims 2–16 are disclosed.

All references cited in this specification, and their references, are incorporated by reference herein where appropriate for appropriate teachings of additional or alternative details, features, and/or technical background.

The above-mentioned and further features and advantages will be apparent from the specific apparatus and its operation described in the examples below, as well as the claims. Thus the present invention will be better understood from this description of these embodiments thereof, including the exemplary tables and the drawing figures (approximately to scale) wherein:

Figure 2:
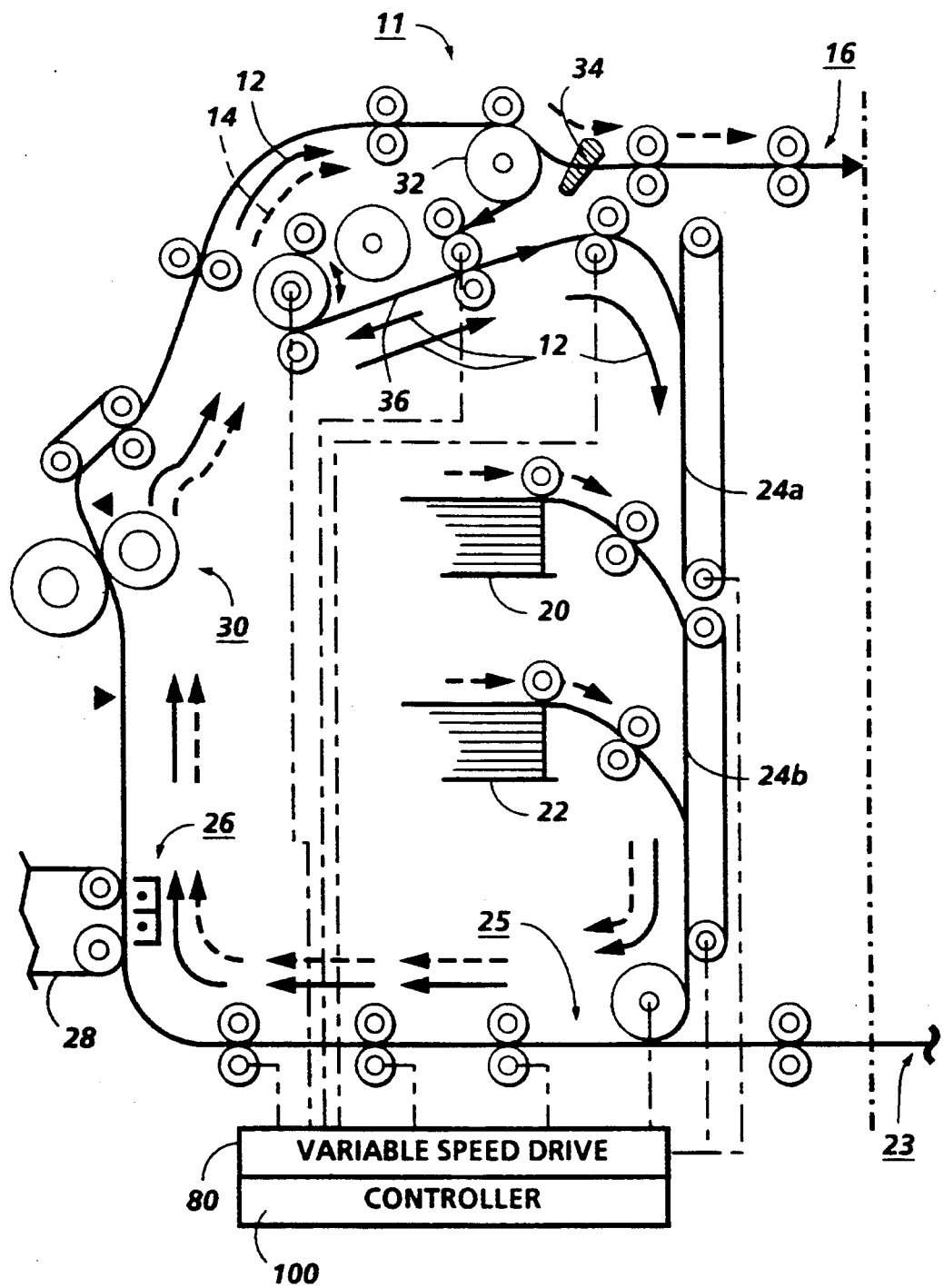
FIG. 2 illustrates another embodiment.
Figure 3:
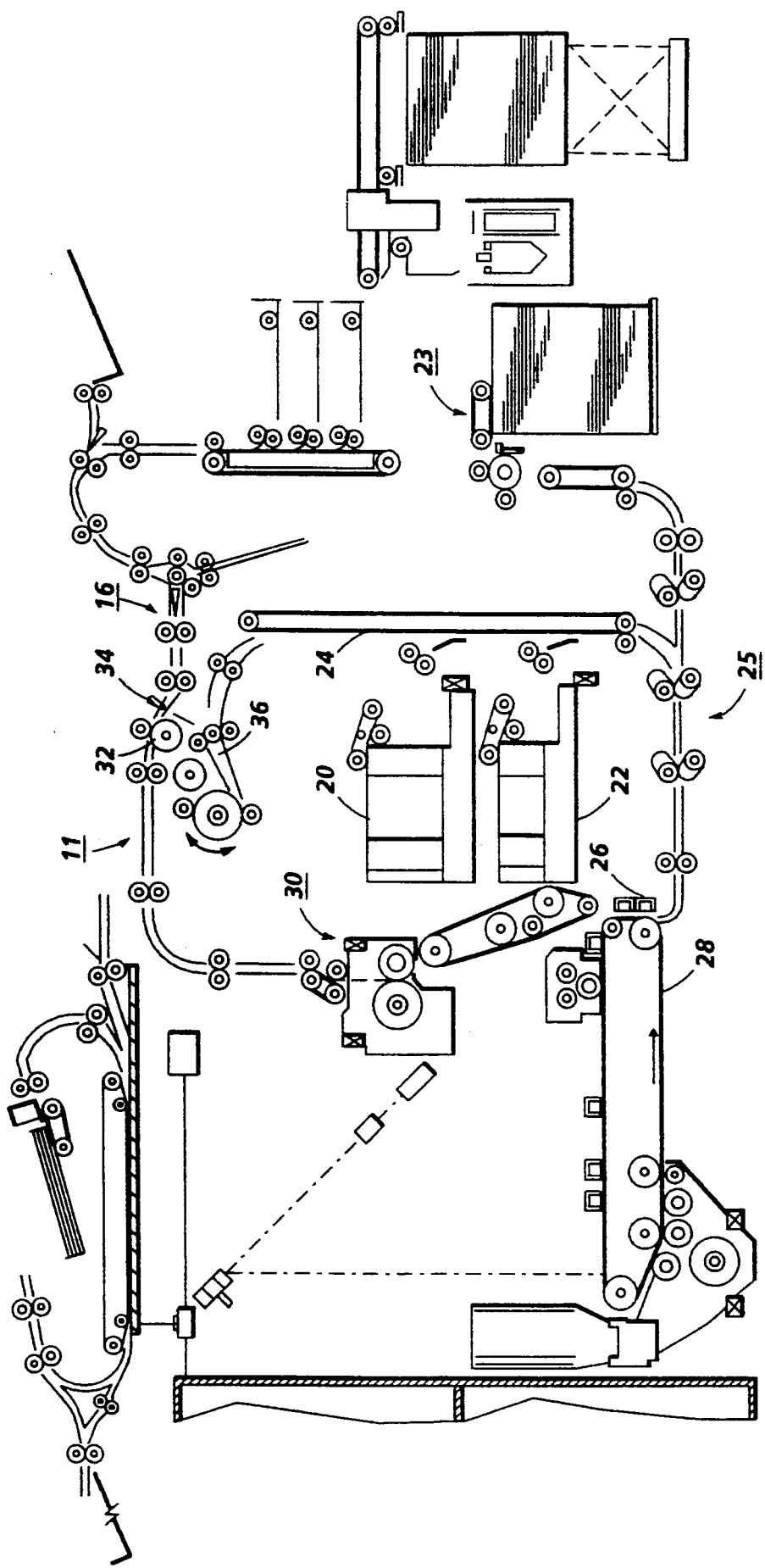

FIG. 3, labeled "Prior Art", is an overall schematic front view of a prior art Xerox Corporation "Docu-Tech" printing system containing a duplex loop path like that of FIG. 2 but without the FIG. 2 modifications thereof.

The disclosed system provides for more efficient collated duplex copy sets production from printers. It may be seen that the exemplary system embodiments described below are intended to eliminate all, or almost all, "skipped" pitches on a copier/printer photoreceptor for most duplex copy/print jobs thereby yielding full productivity in the duplex mode, especially for longer jobs. This system also allows improved productivity even for shorter jobs in some cases. Skipped pitches can be eliminated for job sizes greater than or equal to two duplexed sheets for short paper paths with high speed duplex path servo rolls, and/or job sizes greater than the number of sheet pitches provided in the length "N" of a "trayless" duplex loop [where "N" is the number of sheet pitches in that particular duplex loop]. That is, skipped pitches can be eliminated for job sizes greater than or equal to $2 \times N_f$ pages ($N_f$ sheets), where $N_f$ is the pitch time required to return a sheet to the image transfer station (for second side printing) at the fastest speed available in a variable speed duplex loop path. [Note, however, that a skipped pitch may be required even for long jobs if there are an odd number of pages, and even pages are printed first, but this can be the case for any duplexing mode.]

For purposes of the examples herein, "N" is the time for a sheet to travel through the duplex path from transfer back to transfer. The units for "N" here are pitch times. A pitch time here is the time from one image arriving at transfer until the next image arrives at transfer. The pitch time is normally constant for a given machine with a fixed speed duplex path running a given paper size. However, for a variable speed duplex path, as here, "N" can vary with the path speed. The pitch time can also be different for different paper sizes running in the same machine.

The avoidance of skipped pitches can be achieved, as explained in the examples below (including the Tables) by: (A) feeding at full rate (with no skipped pitches) from the designated clean paper supply sheet feeder the first $N_f$ sheets which are being printed on their first sides, and feeding these first sheets through the duplex loop at high enough (initial) velocities, with a controlled distributed drive (servo or stepper motor), to create a simplex-to-duplex sheet interleaving space between these first sheets, then reducing the duplex path speed incrementally (creating single sheet (one pitch) interleaving spaces between the remainder of these first $N_f$ sheets in the duplex loop) until a steady state process speed is reached; (B) then feeding new sheets at one half the regular feed rate (with skipped pitches in between feeds) from the paper supply while the duplexed (second) sides which are now printing are merging (interleaving) with first side sheets being printed; and finally (C) again driving the duplex path transport return nips at high enough velocities (higher than process speed), by increasing again the duplex loop speed incrementally, at the end of the job run, to maintain a continuous sheet output by closing up the spaces between duplexed sheets.

Describing first in further detail the exemplary printer embodiments with reference to the Figures, there is shown a duplex laser printer 10 (FIG. 1) or 11 (FIGS. 2 and 3) by way of examples of automatic electrostatographic reproducing machines of a type suitable to utilize the duplexing system of the present invention. Although the disclosed method and apparatus is particularly well adapted for use in such digital printers, it will be evident from the following description that is not limited in application to any particular printer embodiment. While the machines 10 or 11 exemplified here are xerographic laser printers, a wide variety of other printing systems with other types of reproducing machines may utilize the disclosed duplexing system, as noted in the second paragraph of this specification.

FIG. 2 is a schematic plan view illustrating the duplex and simplex paper paths through which sheets are conveyed in a modification of an exemplary existing printing system 11 like that of the existing commercial Xerox Corporation "DocuTech" printer shown in FIG. 3 and described in U.S. Pat. No. 5,095,342 and other patents cited above. Hence, FIG. 2 will be discussed first. In this FIG. 2 embodiment the endless loop duplex (second side) paper path 12 through which a sheet travels during duplex imaging is illustrated by the arrowed solid lines, whereas the simplex path 14 through which a sheet to be simplexed is imaged is illustrated by the arrowed broken lines. Note, however, that the output path 16 and certain other parts of the duplex path 12 are shared by both duplex sheets and simplex sheets, as will be described. These paths are also shown with dashed-line arrows, as are the common input or "clean" sheet paths from the paper trays 20 or 22.

After a "clean" sheet is supplied from one of the regular paper feed trays 20 or 22 in FIG. 2, the sheet is conveyed by vertical transport 24 and registration transport 25 past image transfer station 26 to receive an image from photoreceptor 28. The sheet then passes through fuser 30 where the image is permanently fixed or fused to the sheet. After passing through rollers 32, a gate 34 either allows the sheet to move directly via output 16 to a finisher or stacker, or deflects the sheet into the duplex path 12, specifically, first into single sheet inverter 36 here. That is, if the sheet is either a simplex sheet, or a completed duplex sheet having both side one and side two images formed thereon, the sheet will be conveyed via gate 34 directly to output 16. However, if the sheet is being duplexed and is then only printed with a side one image, the gate 34 will be positioned to deflect that sheet into the inverter 36 of the duplex loop path 12, where that sheet will be inverted and then fed to sheet transports 24 and 25 for recirculation back through transfer station 26 and fuser 30 for receiving and permanently fixing the side two image to the backside of that duplex sheet, before it exits via exit path 16.

As shown in FIG. 2 (example 11), (unlike the prior system of FIG. 3) the distributed sheet feeders in duplex path 12 are controlled by a variable speed drive 80. The variable speed drive 80 is preferably controlled by the existing programmable machine controller 100, which also controls the feed/nonfeed timing of paper trays 20 or 22. FIG. 2 shows controlled variable speed drives for all the feed rolls of the duplex path inverter 36, the vertical transport 24 (the long belt transport), and the registration transport 25 (along the bottom here).

Depending on which sheet feeder is supplying clean sheets, part of the initial (here vertical) sheet transport 24 may not need variable speed drives. If paper is being fed from the top feeder (tray 20) then the vertical transport 24 from that point down is shared here. However, if paper is fed in from a high capacity feeder 23 downstream of transport 24 (see, e.g., FIG. 3) then none of the vertical transport 24 need be shared by the duplex path, even in this system 11. Optionally, (unlike the FIG. 3 system) this vertical transport 24 may be divided into two separate transports, divided just above the input to path 24 from the top tray 20 feeder, as shown. The upper vertical transport portion 24a could have variable speed drives. The lower vertical transport portion 24b could also have variable speed drives to be used for duplexing when paper is being fed from the high capacity feeder 23.

Figure 1:
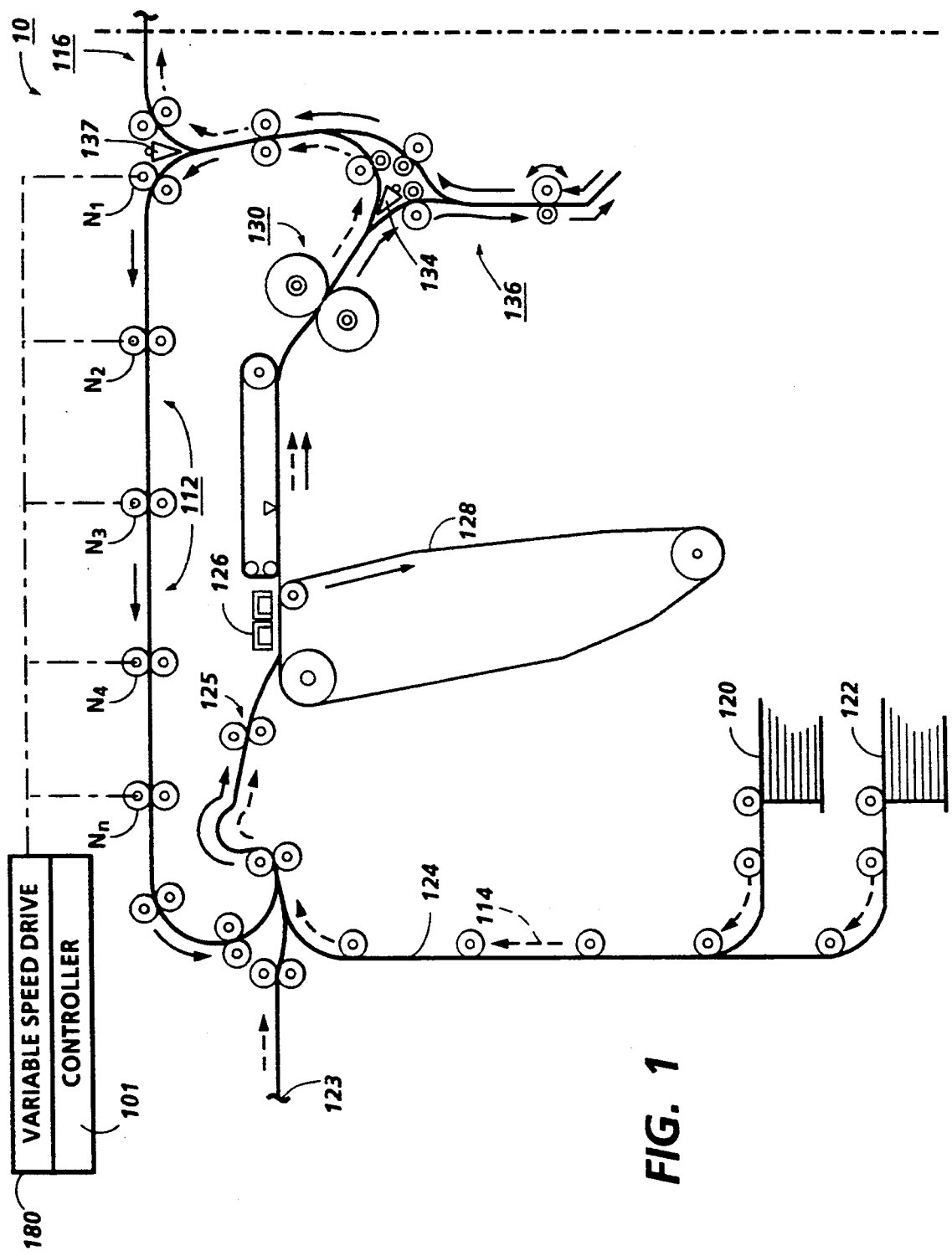
FIG. 1 is a schematic front view of one example of a variable speed endless loop duplex path, which is part of an exemplary duplex printer, comprising one example of the subject improved duplex printing system.

However, in contrast, in the FIG. 1 system 10 type of duplex printing system, variable speed drives and controls are not required for any part of the duplex path which is also shared with simplex printing sheets. This means that (desirably) the sheet registration transport need not have variable speed drives, even though all sheets (both simplex and duplex) pass through it. As shown in FIG. 1, the trayless duplex loop path 112 there has servo driven variable speed controlled drives $N_1$ to $N_n$, and such drives are only in the dedicated duplex path loop 112, not in any shared paths.

Turning now more specifically to this FIG. 1 system 10, the respective comparative elements are numbered similarly, but in a 100s number series. That is, in FIG. 1, the photoreceptor is 128, the clean sheet or paper trays are 120 and 122 (with an optional high capacity input path 123), the vertical sheet input transport is 124, transfer is at 126, fusing at 130, inverting at 136 selected by gate 134, etc.. However, in this embodiment 10 there is an overhead duplex loop path 112 with plural variable speed feeders $N_1$-$N_n$ providing the majority of the duplex path 112 length and providing the duplex path sheet feeding nips; all driven by a variable speed drive 180 controlled by the controller 101. This is a top transfer (face down) system. An additional gate 137 selects between output 116 and dedicated duplex return loop 112 here.

There is disclosed in both said printing systems 10 and 11 here a system and method of filling a trayless duplex loop and providing time to interleave the first and second sides without losing a pitch on the photoreceptor.

As disclosed, the duplex path roller nips and/or belt drive conveyors are independent or distributed drives to allow these speed differentials. This allows additional new design options for increased productivity.

The system disclosed herein achieves full duplex productivity in what may be considered a type of burst-/interleave mode, but without a duplex tray, in a continuous loop duplex path system.

This can be achieved by feeding at full rate from the designated clean sheet feeder for the first $N_f$ sheets which is less than the normal number of duplex path sheets (duplex loop total pitches N), which $N_f$ sheets are imaged on one side and fed into the duplex loop, then feeding more clean sheets at one-half that feed rate while the duplexing sheets being second-side printed are merging (interleaving) with the half-rate fed sheets being first-side-copied; while, meanwhile, the duplex transport drives are accelerated to high enough feeding velocities to create sheet interleaving space between the sheets in the duplex loop, then reducing that speed incrementally to accommodate subsequent sheets in the loop until steady state speed is reached, and finally, increasing the speed incrementally at the end of the job run to maintain a continuous output flow.

To express this another way, this duplexing sequence is made more efficient by eliminating skip cycles while loading up the duplex path at the beginning of each job, and by then depleting the duplex path without skip cycles at the end of that job. It does this by changing the sheet velocity or speed through the duplex path while loading and unloading the duplex path as compared to that speed during the intervening stages of the job when odds and even pages are being interleaved.

This duplexing system and algorithm disclosed herein especially favors longer jobs. For job lengths of less than the number of sheets required to fill the duplex path, some skip cycles would still be required. But the increased speed of sheets through the duplex path would result in fewer skip cycles than for equivalent systems with a fixed paper path speed, such as in the "9700" duplex printer.

Turning now to the Tables, Tables 1–16 below provide some operating examples and comparisons. In the first two (comparative) Tables are two examples of sequences or algorithms for duplex printing with a printer with a trayless duplex paper path which is 5 sheets long. Table 1 is a prior art system for comparison with one example of the present system in Table 2. Prior system tables here are 1, 3, 4, 6, 7, 9, 10, 12, and 13; and new system tables are 2, 5, 8, 11, 14, 15, and 16. A "page #" here is defined as the image on or for a single side of a single sheet. "P/R Pitch #" is the sequence of usable photoreceptor frames or document image areas. The job length or number of document pages in the particular job (collated document set) will obviously vary, and is 16 pages in this Tables 1 and 2 example. Thus, this is a job of 8 duplex sheets (i.e., ½ the number of pages, for an even page duplex job). This is for a forward serial page order or "1 to N" printing system example, although "N to 1" systems are also known. "Page # SIMP" is the printing of a first side page, and "Page # DUP" is the printing of a second page on the opposite side of a sheet, in the respective vertical columns indicated for that "P/R Pitch #". "X" here represents each skipped (non-print) pitch.

"No. Pitches" in the last line of Table 2 shows the number of pitches between the 1st and 2nd side printings (image transfers) of the respective (above) completed duplex sheet. This also illustrates the difference in their respective overall duplex path transit speeds, measured in pitches. E.g., here, 3, 4, 5, 5, 5, 5, 4 and 3 pitches, respectively.

As can be seen by comparison, in the second Table 2 versus Table 1, below, a savings of four non-skipped (utilized) photoreceptor (P/R) panels or pitches can be realized in this example. No pitches are skipped.

TABLES

1. Prior Trayless Duplex Interleaving Mode

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| PAGE # SIMP | 1 | X | 3 | X | 5 |  | 7 |  | 9 |  | 11 |  | 13 |  | 15 |  | X |  | X |  |
| PAGE # DUP |  | X |  | X |  | 2 |  | 4 |  | 6 |  | 8 |  | 10 |  | 12 | X | 14 | X | 16 |

2. New Trayless Duplex Operating Mode

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| PAGE # SIMP | 1 | 3 | 5 |  | 7 |  | 9 |  | 11 |  | 13 |  | 15 |  |  |  |  |  |  |  |
| PAGE # DUP |  |  |  | 2 |  | 4 |  | 6 |  | 8 |  | 10 |  | 12 | 14 | 16 |  |  |  |  |
| No. Pitches |  |  |  | 3 |  | 4 |  | 5 |  | 5 |  | 5 |  | 5 | 4 | 3 |  |  |  |  |

3. Sheet Sequence, Interleave Mode (5 pitch duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | X | 3 | X | 5 |  | 7 |  | 9 |  | 11 |  | 13 |  | 15 |  | 17 |  | 19 |  | 21 |  | X |  | X |  |  |  |  |  |
| Dup pg # |  | X |  | X |  | 2 |  | 4 |  | 6 |  | 8 |  | 10 |  | 12 |  | 14 |  | 16 |  | 18 | X | 20 | X | 22 |  |  |  |  |

4. Sheet Sequence, Burst Mode (5 pitch duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | 5 | 7 | 9 |  |  |  |  |  | 11 | 13 | 15 | 17 | 19 |  |  |  |  |  | 21 | X | X | X | X |  |  |  |  |  |
| Dup pg # |  |  |  |  |  | 2 | 4 | 6 | 8 | 10 |  |  |  |  |  | 12 | 14 | 16 | 18 | 20 |  | X | X | X | X | 22 |  |  |  |  |

5. Sheet Sequence, Variable Speed Burst/Interleave Mode (NEW) (5 pitch steady state duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | 5 |  | 7 |  | 9 |  | 11 |  | 13 |  | 15 |  | 17 |  | 19 |  | 21 |  |  |  |  |  |  |  |  |  |  |  |
| Dup pg # |  |  |  | 2 |  | 4 |  | 6 |  | 8 |  | 10 |  | 12 |  | 14 |  | 16 |  | 18 | 20 | 22 |  |  |  |  |  |  |  |  |

6. Sheet Sequence, Interleave Mode (5 pitch duplex path, 4 page job)

| P/R Pitch | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|

-continued

6. Sheet Sequence, Interleave Mode (5 pitch duplex path, 4 page job)

| # | | | | | | | |
|---|---|---|---|---|---|---|---|
| Simp pg # | 1 | X | 3 | X | X | | X |
| Dup pg # | | X | | X | X | 2 | X | 4 |

7. Sheet Sequence, Burst Mode (5 pitch duplex path, 4 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | X | X | X | | | | | | | | | | | | | | | | | | | | | | | | | |
| Dup pg # | | | X | X | X | 2 | 4 | | | | | | | | | | | | | | | | | | | | | | | |

8. Sheet Sequence, Variable Speed Burst/Interleave Mode (NEW) (5 pitch steady state duplex path, 4 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | X | | | | | | | | | | | | | | | | | | | | | | | | | | | |
| Dup pg # | | X | 2 | 4 | | | | | | | | | | | | | | | | | | | | | | | | | | |

9. Sheet Sequence, Interleave Mode (9 pitch duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | X | 3 | X | 5 | X | 7 | X | 9 | | 11 | | 13 | | 15 | | 17 | | 19 | | 21 | | X | | X | | X | | X | |
| Dup pg # | | X | | X | | X | | X | | 2 | | 4 | | 6 | | 8 | | 10 | | 12 | | 14 | X | 16 | X | 18 | X | 20 | X | 22 |

10. Sheet Sequence, Burst Mode (9 pitch duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | 5 | 7 | 9 | 11 | 13 | 15 | 17 | | | | | | | | | | 19 | 21 | X | X | X | X | X | X | X | | | |
| Dup pg # | | | | | | | | | | 2 | 4 | 6 | 8 | 10 | 12 | 14 | 16 | 18 | | | X | X | X | X | X | X | X | 20 | 22 | |

11. Sheet Sequence, Variable Speed Burst/Interleave Mode (NEW) (9 pitch steady state duplex path, 22 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | 3 | 5 | 7 | 9 | | 11 | | 13 | | 15 | | 17 | | 19 | | 21 | | | | | | | | | | | | | |
| Dup pg # | | | | | 2 | | 4 | | 6 | | 8 | | 10 | | 12 | | 14 | 16 | 18 | 20 | 22 | | | | | | | | | |

12. Sheet Sequence, Interleave Mode (9 pitch duplex path, 4 page job)

| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Simp pg # | 1 | X | 3 | X | X | X | X | X | X | | X | | | | | | | | | | | | | | | | | | | |
| Dup pg # | | X | | X | X | X | X | X | X | 2 | X | 4 | | | | | | | | | | | | | | | | | | |

| 12. Sheet Sequence, Interleave Mode (9 pitch duplex path, 4 page job) |
| --- |
| pg # |

| 13. Sheet Sequence, Burst Mode (9 pitch duplex path, 4 page job) | | | | | | | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| Simp pg # | 1 | 3 | X | X | X | X | X | X | X | | | | | | | | | | | | | | | | | | | | | |
| Dup pg # | | | X | X | X | X | X | X | X | 2 | 4 | | | | | | | | | | | | | | | | | | | |

| 14. Sheet Sequence, Variable Speed Burst/Interleave Mode (NEW) (9 pitch steady state duplex path, 4 page job) | | | | | | | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| Simp pg # | 1 | 3 | X | X | X | | | | | | | | | | | | | | | | | | | | | | | | | |
| Dup pg # | | | X | X | X | 2 | 4 | | | | | | | | | | | | | | | | | | | | | | | |

| 15. Sheet Sequence, Variable Speed Burst/Interleave Mode (NEW) (9 pitch steady state duplex path, 22 page job) | | | | | | | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| Simp pg # | 1 | 3 | 5 | 7 | 9 | 11 | 13 | | 15 | | 17 | | 19 | | 21 | | | | | | | | | | | | | | | |
| Dup pg # | | | | | | | | 2 | | 4 | | 6 | | 8 | | 10 | 12 | 14 | 16 | 18 | 20 | 22 | | | | | | | | |

| 16. Sheet Sequence, Variable Speed Burst/Interleave Mode (NEW) (9 pitch steady state duplex path, 4 page job) | | | | | | | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| P/R Pitch # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| Simp pg # | 1 | 3 | X | X | X | X | X | | | | | | | | | | | | | | | | | | | | | | | |
| Dup pg # | | | X | X | X | X | X | 2 | 4 | | | | | | | | | | | | | | | | | | | | | |

In the printer of this Table 1-2 example, and Tables 3-8, this duplex buffer loop path length "N" is 5 copy sheets long when running at the normal process speed, determined by the photoreceptor velocity. Thus a 5 sheet batch system may be provided. It may be seen from the second Table that even though the duplex loop path is normally 5 sheets in length, the first sheet was actually back at the transfer station for its second side [page #2 dup] image here by the 4th pitch, and likewise sheet ¾, but that all intermediate copies 2, 7, 4, 9 are made and fed with 5 pitches between front and back sides as before. It may be seen that the first 3 sheets (1, 3, 5) to be duplexed are fed by the sheet feeders of tray 20 or 22 without any skipped pitches, and the others are fed with a skipped pitch in between feeds. Here, the first two sheets and the last two sheets run at different speeds in the duplex path than the other sheets.

To express this in different words, in the second Table example of a 5 pitch duplex loop, the first 3 front sides (1, 3, 5) are imaged directly sequentially. By accelerating the first of these sheets (page 1) to a higher velocity in the duplex loop, it reaches the transfer station ready to accept its back side image immediately after the last of the first three front side images has been transferred. This leaves room for another front side sheet (page 7) to pass through transfer before the second sheet (page 3) reaches the transfer station ready to accept its back side image (page 4). The second sheet had also been accelerated in the duplex path, but to a lower velocity. This, again, leaves room for another front side sheet to pass through transfer before the third sheet reaches the transfer station ready to accept its back side image. The duplex loop may then run at a constant velocity until the last front side is completed. Then, the sheets in the duplex loop are again accelerated to run at the higher velocity to close the gaps so that again no pitches are lost on the photoreceptor. This allows the elimination of 4 skipped pitches of photoreceptor for all jobs with more than 3 duplex sheets in this case.

Skipped pitches are, however, provided after the first and second front side pages, and after the last and next-to-last back side pages, for machines with a 5 pitch duplex path running in an interleaved mode. Those "holes" are left to allow back side sheets to interleave with front side sheets.

In the example of Tables 3-5, the duplex path drives can be controlled to cause the time for sheets to be returned to transfer to be one of three values: 3 pitch times (fastest), 4 pitch times (intermediate), and 5 pitch times (steady state). The sheets which receive pages 1 and 21 (first and last) pass through the path in 3 pitch times. The sheets which receive pages 3 and 19 (second and second from last) pass through the path in 4 pitch times. All other sheets (at steady state) pass through the path in 5 pitch times.

In the example of Tables 6-8, the duplex path drives can be controlled to cause the time for sheets to be returned to transfer to be one of three values: 3 pitch times (fastest), 4 pitch times (intermediate), or 5 pitch times (steady state). Since there are only two sheets, both (first and last) pass through the path in 3 pitch times.

In the example of Tables 9-11, the duplex path drives can be controlled to cause the time for sheets to be returned to transfer to be one of five values: 5 pitch times (fastest), 6 pitch times (intermediate), 7 pitch times (intermediate), 8 pitch times (intermediate), or 9 pitch times steady state). The sheets which receive pages 1 and 21 (first and last) pass through the path in 5 pitch times. The sheets which receive pages 3 and 19 (second and second from last) pass through the path in 6 pitch times. The sheets which receive pages 5 and 17 (third and third from last) pass through the path in 7 pitch times. The sheets which receive pages 7 and 15 (fourth and fourth from last) pass through the path in 8 pitch times. All other sheets (at steady state) pass through the path in 9 pitch times.

In the example of Tables 12-14, the duplex path drives can be controlled to cause the time for sheets to be returned to transfer to be one of five values: 5 pitch times (fastest), 6 pitch times (intermediate), 7 pitch times (intermediate), 8 pitch times (intermediate), or 9 pitch times (steady state). Since there are only two sheets, both (first and last) pass through the path in 5 pitch times.

In the examples of FIGS. 15 and 16, the range of speeds which the duplex path produces is somewhat arbitrary. The low speed is limited by timing. The speed must be fast enough to keep sheets from overlapping. The high speed will probably be limited by other functional problems such as noise, power, and reliability for a particular design. Here are some alternate examples for the 9 pitch steady state path. The range of speeds has been reduced. It can still be compared with the other trayless 9 pitch trayless duplex modes. The trade off is more skipped pitches for small jobs.

In the example of Tables 15-16, the duplex path drives can be controlled to cause the time for sheets to be returned to transfer to be one of three values: 7 pitch times (fastest), 8 pitch times (intermediate), or 9 pitch times (steady state). The first and last sheets pass through the path in 7 pitch times. The second and second from last sheets pass through the path in 8 pitch times. All other sheets (at steady state) pass through the path in 9 pitch times.

These examples make comparisons between variable speed duplex paths and fixed speed duplex paths running at the low end of the variable speeds range. If the fixed speed path was running at the upper end of the speed range the variable speed duplex path would still be advantaged but the advantage would be less for smaller length jobs. For example, compare the variable speed case with a fastest speed of 5 pitch times to the other five pitch trayless duplex cases.

It may be seen that a duplex path with at least two different sheet feeding speeds is required. Also, the timing (on/off) of the clean sheet feeders changes. The first few sheet to be duplexed are fed at the normal paper feeding sequential rate and velocity to the transfer station for their first side image, but then in the duplex path loop they are accelerated sufficiently to create sufficient space between those sheets such that when they are returned to the transfer station for their second side images, clean sheets (for first side images) may be interleaved between each second side sheet, i.e., interleaved with the first side copies.

However, at least three different versions of implementations of the variable speed duplex path can still be provided even for a system with only a dual or two speed selection for the duplex transport. First, for the 5 pitch example, the first two sheets can pass through the duplex path at the faster speed: the first sheet in 3 pitches, the second in 4 pitches, as shown in Table 2. At this faster speed, the duplex transport is run at twice the normal (process) speed for 2 pitches after the lead edge of the first sheet enters the transport. In this way, the first sheet is moved two pitch times farther ahead of subsequent sheets which pass through the duplex transport at the other, normal, speed. The second sheet enters the transport one pitch time after the first, so it travels at the high speed for only one pitch time. This results in the second sheet moving one pitch time farther ahead of the subsequent sheets which pass through at the normal speed. The third sheet does not enter the transport until two pitch times after the first. By this time the transport has returned to the second or normal speed. Near the end of the job, the duplex transport is returned to the high speed (twice the normal speed) immediately after the third from last sheet leaves the transport. In this way, the second from last sheet will be transported at the high speed for one pitch time and the last sheet will be transported at the high speed for two pitch times, moving them ahead one and two pitch times respectively.

For a longer duplex loop path, this above approach can be modified to handle a larger range of sheet times by running the transport at the high speed for longer times. If the duplex transport were run at the high speed for 3 pitch times, then three sheets would be moved ahead: by three, two, and one pitches respectively. The duplex transport path length would need to accommodate the distance a sheet would travel for the specified time at the higher speed.

If the high speed were more than twice the normal speed, then the transport would need to switch between normal and high speed for the appropriate length of time to move ahead one pitch time as each sheet to be accelerated entered the transport. Higher speeds may allow the length of the variable speed transport to be shorter.

For a system with segmented duplex transport drives, where different sections of the duplex transport can change speeds independently, the available speeds within each section could still be limited to two. This segmentation would allow more flexibility to affect the speed of one sheet without affecting the speed of another. The sheet timing objective would be the same as above. Drives control to accomplish that objective should be straightforward.

The most flexible system involves infinitely variable drives for a segmented duplex transport, rather than only two different speeds. This approach allows different sheets to be driven at different "higher" speeds, as well as controlling which sheets are affected. It may also allow some optimization of transport length, power, noise and related parameters.

In summary, there are disclosed several embodiments of an improved copying sequence for duplex printing for a printer with a trayless duplex paper path. While the embodiment disclosed herein are preferred, it will be appreciated from this teaching that various alternatives, modifications, variations or improvements therein may be made by those skilled in the art, which are intended to be encompassed by the following claims:

We claim:

1. In a duplexing reproduction apparatus of a given sheet printing rate, with a control system for printing and outputting collated duplex copy sets of plural duplex copy sheets from input jobs of plural page images, wherein said collated duplex copy sheets have one said input page imaged on their first side and then another said input page imaged on their second side, in proper collated order, and wherein said duplexing reproduction apparatus has a trayless buffer loop duplexing path with duplexing path sheet feeders providing a duplexing path of a known plural copy sheet length at said given sheet printing rate for recirculating in said duplexing path with said duplexing path sheet feeders said copy sheets imaged on their first sides back to be imaged on their second sides to make said collated duplex copies, the improvement comprising:

a variable speed sheet drive system for said duplexing path variably controlled by said control system for driving at least a substantial portion of said duplexing path sheet feeders in said duplexing path at at least two different sheet feeding speeds, so as to increase said duplex copy sets output rate of said apparatus without requiring an increase in said given sheet printing rate;

said control system controlling said variable speed drive system for said duplexing path sheet feeders to initially sequentially feed a predetermined limited number of said copy sheets imaged on said first side into said duplexing path, which initial limited number of copy sheets is less than said known sheet length of said duplexing path, said control system feeding at least one of said initial limited number of copy sheets in said duplexing path with said duplexing path sheet feeders at a higher sheet feeding speed which is substantially greater than said given sheet printing rate so as to create a sheet interleaving space relative to a subsequent said sheet in said duplexing path;

said control system then reducing the average velocity of said duplexing path sheet feeders for subsequent said copy sheets in said duplexing path so that said first and second side imaging can be alternated by imaging other first side sheets in said interleaving spaces provided by said variable speed drive system between said first side imaged sheets in said duplexing path.

2. The duplex reproduction apparatus of claim 1, wherein said control system variably increases the average sheet feeding speed in said duplexing path of the final sheets for a duplex copy set so as to remove said sheet interleaving spaces as said final sheets are fed out of said duplexing path.

3. The duplexing reproduction apparatus of claim 2 wherein a plurality of said predetermined limited initial number of copy sheets are fed through said duplexing path at said higher sheet feeding speed for different lengths of time to provide said interleaving spaces between said sheets.

4. The duplexing reproduction apparatus of claim 1 wherein a plurality of said predetermined limited initial number of copy sheets are fed through said duplexing path at said higher sheet feeding speed for different lengths of time to provide said interleaving spaces between said sheets.

5. The duplexing reproduction apparatus of claim 1, wherein said apparatus is operated by said control system in a burst-interleave mode for each said input job of plural page images to generate said collated duplex copy sets, and wherein said limited initial number of copy sheets enters said duplexing path in immediate sequence at said given sheet printing rate without interleaving spaces therebetween.

6. The duplexing reproduction apparatus of claim 1 wherein the majority of said duplex path sheet feeders are variably operated at at least two different speeds by said variable speed drive system during each said printing of a duplex copy set.

7. The duplexing reproduction apparatus of claim 1 wherein said duplexing path sheet feeders are driven by said variable speed drive system at a constant velocity corresponding to said given sheet printing rate for all copy sheets other than the first and last few sheets of each said collated duplex copy set.

8. The duplexing reproduction apparatus of claim 1 wherein said higher sheet feeding speed is twice said given sheet printing rate.

9. The duplexing reproduction apparatus of claim 1, wherein said apparatus is operated by said control system in a burst-interleave mode by eliminating skipped sheet feedings and skipped sheet imagings while initially filling said duplexing path with sheets at the beginning of each said input job, and then depleting the sheets in said duplexing path without skipping sheet imagings at the end of each said input job, by changing the sheet feeding velocity in said duplexing path during the times said duplexing path is filling and depleting as compared to the sheet feeding velocity in said duplexing path during intervening stages of said duplex copy set job printing.

10. In a duplexing method for more efficiently printing collated duplexed sets of duplex copy sheets from a multipage job set of electronically reorderable page images with a printer, for a printer having a trayless duplexing loop path with duplex transport drives for recirculating copy sheets imaged on their first sides back to be imaged on their second sides to produce said collated duplex copy sets, the improvement wherein:

said duplex transport drives are operated to recirculate said copy sheets in said duplexing loop path at variable speeds, specifically;

initially feeding a limited initial number of sheets to be printed on their first sides for said duplex copy set at a full sheet feeding rate without interleaving sheet spaces, which limited number of initial sheets are imaged on their first sides and fed into said duplexing loop path, accelerating at least some of said duplex transport drives to higher sheet feeding velocities to increase said sheet feeding speed in said duplexing loop path and then incrementally reducing said sheet feeding speed in said duplexing loop path while accommodating said sheets in said duplexing loop path until a steady state speed is reached, so as to create sheet interleaving spaces between said sheets in said duplexing loop path;

then feeding more sheets to be printed on their first sides at one-half of said full sheet feeding rate to be sequentially imaged on their first sides interleaved in said sheet interleaving spaces with sheets being printed on their second sides;

and then increasing said duplexing loop path sheet feeding speed incrementally for the final sheets of said duplex copy set to close up said sheet interleaving spaces and maintain a substantially continuous sheet output.

11. In a duplexing method wherein copy sheets being duplexed are recirculated for their second side imaging in a trayless loop duplexing path to generate collated sets of duplex copy sheets from a plural sheet input job, which duplex path is at least partially filled with said sheets at the beginning of each input job and depleted at the end of each input job; the improvement wherein said duplexing is done in a burst-interleave mode comprising eliminating skipped sheet feedings and skipped sheet imagings while initially filling said duplexing path with sheets at the beginning of each said input job, and then depleting the sheets in said duplexing path without skipping sheet imagings at the end of each said job, by variably changing the sheet feeding velocity in said duplexing path during the times said duplexing path is filling and depleting as compared to the sheet feeding velocity in said duplexing path during intervening stages of said duplex copy set job printing.

12. In a duplexing method for more efficiently printing collated duplex sets of duplex copy sheets from a multipage job set of electronically reorderable page images with a printer having a trayless duplexing loop path with duplex transport drives for recirculating copy sheets imaged on their first sides back to be imaged on their second sides to produce said collated duplex copy sets said duplex transport drives are normally driven at a normal sheet feeding speed; the improvement wherein said duplexing loop path duplex transport drives are operated to recirculate said copy sheets in said duplexing loop path at variable sheet feeding speeds; and wherein at least the first initial sheet for each duplex copy set is fed within said duplexing loop path at a faster sheet feeding speed which is approximately twice said normal speed for at least approximately two sheet lengths after the lead edge of the first sheet enters the duplexing path loop, so that said first sheet is moved at least one sheet length ahead of a subsequent sheet which is fed through said duplexing path loop.

13. The duplexing method of claim 12, wherein the second initial sheet for each duplex copy set enters said duplexing path loop immediately after said first sheet, but is fed at said faster speed for approximately one less sheet length than said first sheet, to cause said second sheet to move one sheet length behind said first sheet but at least one sheet length ahead of subsequent sheets which pass through said duplexing path loop at said normal sheet feeding speed, to provide at least one sheet length interleaving spacing between said first and second and subsequent sheets.

14. The duplexing method of claim 13, wherein said at least first and second initial sheets are fed into said duplexing loop path in direct sequence without any initial sheet interleaving space therebetween, and wherein subsequent copy sheets after said at least first and second sheets are fed into said duplexing loop path at one-half rate with sheet interleaving spaces therebetween.

15. The duplexing method of claim 13, wherein the maximum number of said initial sheets is a number of sheets approximately equal to one-half of the maximum number of sheets which can be fed in said duplexing loop path.

16. The duplexing method of claim 12, wherein said duplexing loop path transport drives are also operated at said faster sheet feeding speed after at least the third from last sheet for the duplex copy set leaves said duplexing loop path, so that the second from last sheet and the last sheet will be transported at said faster speed for different distances, so as to move the second from last and last sheets ahead one and two sheet lengths respectively, and to thereby remove said sheet interleaving spacing therebetween.

* * * * *